United States Patent [19]

Berthiaume

[11] Patent Number: 4,558,873
[45] Date of Patent: Dec. 17, 1985

[54] MECHANICAL SEAL

[76] Inventor: William J. Berthiaume, Exeter Rd., Exeter, N.H. 03833

[21] Appl. No.: 519,186

[22] Filed: Aug. 1, 1983

[51] Int. Cl.$^4$ .............................................. F16J 15/34
[52] U.S. Cl. ................................ 277/96.1; 277/93 SD
[58] Field of Search ........................... 277/93 SD, 96.1

[56] References Cited

U.S. PATENT DOCUMENTS

| | | | |
|---|---|---|---|
| 1,787,459 | 1/1931 | Tawresey | 277/96.1 |
| 2,744,774 | 5/1956 | Wist | 277/96.1 |
| 2,747,901 | 5/1956 | Clavell | 277/96.1 |
| 2,916,332 | 12/1959 | Pavlecka | 277/96.1 |
| 4,281,839 | 8/1981 | Schoenmeyr | 277/93 SD |
| 4,406,462 | 9/1983 | Witten | 277/93 SD |

Primary Examiner—Robert I. Smith
Attorney, Agent, or Firm—Paul J. Cook

[57] ABSTRACT

A mechanical seal for pumps utilized in harsh environments such as coal/oil slurries or the like, where an annular head assembly is disposed in an annular recess in the pump housing, through which a rotatable shaft is journalled. A rotor, biased by a spring which is secured to the shaft, is pressed against the annular head assembly portion of the seal. Each component has a non-planar surface which is in rubbing contact with the another, the non-planar surfaces preferably being the shape of a truncated cone, the juncture of the surfaces being disposed within the space defined by the annular recess, to minimize particulate buildup, the non-planar faces permitting self-seating thereof due to misalignment, wear or contamination.

5 Claims, 4 Drawing Figures

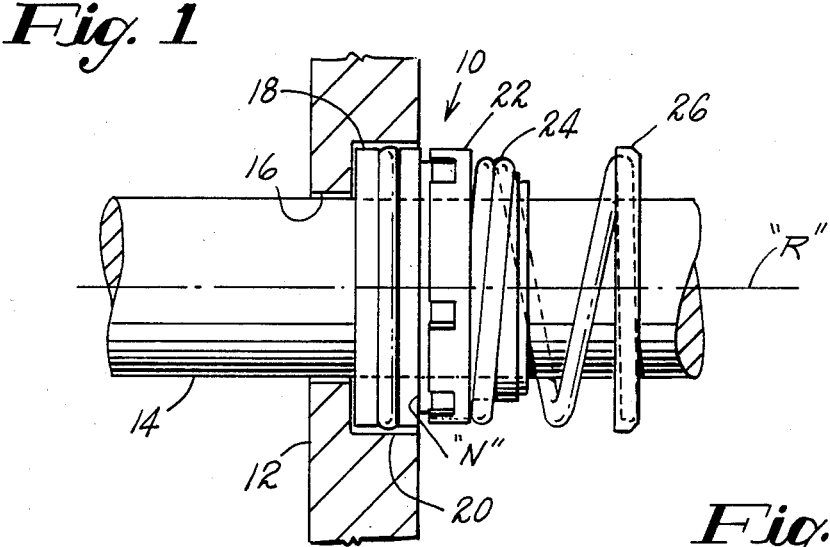
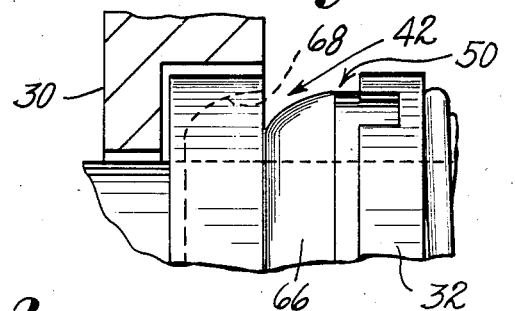
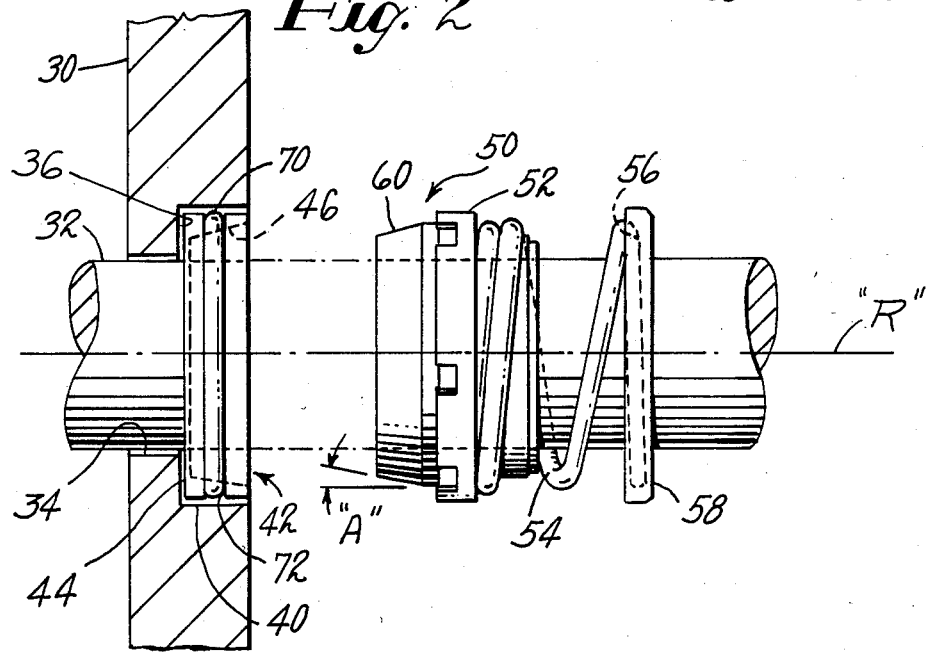

MECHANICAL SEAL

BACKGROUND OF THE INVENTION

(1) Field of the Invention

The invention relates to mechanical seals, and more particularly to rotary seals on shafts in high pressure pumps.

(2) Prior Art

Mechanical, rotary, or end-face seals comprise an arrangement of rotating and stationary elements disposed about a rotatable shaft, the elements being in "rubbing" contact to form a sealing face with minimum leakage therethrough. The rotating elements comprise radial planar surfaces, normal to the shaft axis, cooperating as a thrust bearing. One face is generally resiliently gasketed to a housing, and the other face is rotated with the shaft, sealed therewith by a bellows or other type of packing, permitting some axial motion to compensate for wear and play. Bearing contact between the faces is usually accomplished by spring loading one of the rotating elements.

This type of mechanical seal is found on high pressure pumps involved with refinery and chemical industry processes and where an abrasive medium is pumped, such as coal/oil slurries. Particulate buildup does cause seal-face distortion such as concavity, convexity, waviness or non-uniform contact, which distortion may also arise from shaft misalignment, improper assembly, non-uniform bolting stresses or the like, all of which contribute to leakage of the process medium and bearing and seal failure.

Other types of seals found in the prior art, in addition to the aforementioned type having the radial planar faces, are shown by U.S. Pat. No. 2,170,134, wherein a pair of packing rings with lubricant impregnated cores and pliant metallic shells are cut into sections and transformed by spinning into conical shaped packing rings. The sides however, have slits formed therealong, which can collect particulate matter.

Sealing packings, are those shown by U.S. Pat. Nos. 1,788,966 and 4,039,198. Packings, however, by virtue of their resilience, provide a radially directed force against (and away from) the shaft, when they are tightened by collars or the like. The packings can accumulate particulate matter and score the shaft. The packing gland in the U.S. Pat. No. 4,039,198 patent is of a conical shape but it is segmented, again providing places for accumulating particulate matter.

It is an object of the present invention to overcome the drawbacks of the prior art.

It is a further object of the present invention to provide a mechanical seal which will not score a rotating shaft, which will not accumulate particulate matter, and which will compensate for eccentricities of its associated rotating shaft.

BRIEF SUMMARY OF THE INVENTION

The present invention comprises a mechanical seal for a rotatable shaft of a pump. The seal mates snugly in an annular recess in the pump housing, through which the rotatable shaft is journalled. The head assembly is that part of the seal that mates with the annular recess of the housing, and is in abutting relationship with the shoulder portion of the housing. The head assembly is enclosed by the periphery of the annular recess in the housing.

The mechanical seal also comprises a rotor portion, which snugly mates with the shaft and is in biased contact with the head assembly of the seal. The rotor portion includes a spring and a spring holder each disposed about the shaft, the holder secured thereto against rotation. The spring biases the rotor portion of the seal against the head assembly.

The rotor portion has a smooth non-planar face which mates with a corresponding non-planar face of the head assembly. In a preferred embodiment, the rotor portion has a truncated cone shaped face which matches a truncated cone shaped receiving face of the head assembly. The sealing surfaces in this embodiment are not exposed to particulate matter which would otherwise build-up, as between planar faces normal to the axis of rotation of the shaft. The conical relationship between the head assembly and the rotor portions of the seal also facilitates self seating, providing extended life to the head assembly, which is stationary, and to the rotor, which rubs thereagainst, due to their constant uniform self-seating action.

A further embodiment comprises a face of the rotor of convex proportions. That is, the face has a smooth truncated hemispherical shape, the truncated portion comprising that central area through which the shaft extends. The head assembly, in this embodiment, has a receiving face of concave proportions to rotatably receive the face of the hemispherical shape of the rotor, the hemispherical shape of course, having a central opening for disposition of the rotatable shaft.

The non-planar, non-exposed mating surfaces of the head assembly and the rotor significantly extend the life of the seal unit because they compensate for any misalignment of components or for eccentritities in the shaft.

BRIEF DESCRIPTION OF THE DRAWINGS

The objects and advantages of the present invention will become more apparent when viewed in conjunction with the following drawings, in which:

FIG. 1 is a side elevational view of a conventional mechanical seal of the prior art;

FIG. 2 is a side elevational view partially in section of a mechanical seal designed according to the principles of the present invention;

FIG. 2A shows an alternative embodiment of the mating faces of the mechanical seal.

DESCRIPTION OF THE PREFERRED EMBODIMENTS

Figure 3:
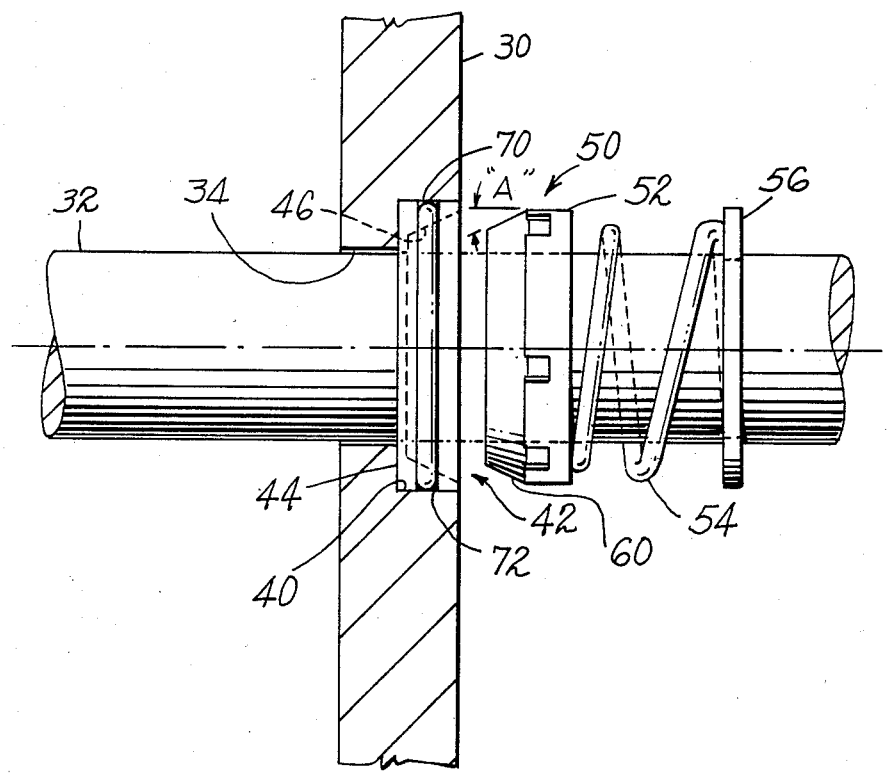
FIG. 3 is a side elevational view, partially in section of a mechanical seal of slightly different angular configuration of that shown in FIG. 2.

Referring to the drawings in detail, and particularly to FIG. 1, there is shown a conventional mechanical seal 10, of the prior art, wherein a pump housing 12 has a shaft 14 journalled through an opening 16 therein. A conventional stationary head assembly 18 is shown disposed in an annular recess 20 about the opening 16, with a conventional biased rotor 22, pressed by a spring 24 anchored in a spring holder 26 secured to the shaft 14. Both the conventional head assembly 18 and the conventional rotor 22 have rubbing faces "N" which are planar and normal to the axis of rotation of the shaft 14. Particulate matter may work its way between the rubbing planar faces causing errosion and skewing them with respect to one another, permitting leakage of process medium and premature failure of the seal assembly.

The mechanical seal of the present invention is shown in FIG. 2, wherein a pump housing 30 has a rotatable shaft 32 journalled through an opening 34 therein. The opening 34 is of stepped configuration, having a shoulder-like ring 36 which steps it to an annular recess 40 disposed therearound. An improved stationary head assembly 42 is snugly pressed into the annular recess 40, and around the shaft 32. The improved head assembly 42 comprises an annular member having a planar rear face 44 normal to the axis of rotation "R" of the shaft 32, which planar face 44 is disposed against the shoulder portion 36, and is in contact therewith. A smooth non-planar face 46, shown by dashed lines in FIG. 2, may be of a truncated conical configuration in a preferred embodiment, which comprises the receiving surface for the improved head assembly 42, which assembly 42 is completely received within the annular recess 40.

An improved rotor 50, comprising the male portion of the seal, is shown disposed about the shaft 32, in FIG. 2. The rotor 50 has an annular collar 52 which receives a spring 54. The spring 54 mates at its other end in a channel 56 of a spring holder 58 which is secured by proper means, not shown, to the rotatable shaft 32. The improved rotor 50 has a smooth non-planar face 60 which is matable with the non-planar face 46 of the improved head assembly 42. In the preferred embodiment, the non-planar face 60 is tapered into a truncated cone-like shape for a self-seating effect with the face 46 of the improved head assembly 42.

When the spring 54 biases the non-planar face 60 of the improved rotor 50 into rubbing contact with the non-planar face 46 of the improved head assembly 42, the juncture of the two non-planar faces 46 and 60 is within the space of the annular recess 40, denying access thereto of any particulate matter which may be in the environment and which would interfere with proper sealing. The smooth conical interface is suited however, to self-seating even if it were contaminated by debris from the pump medium.

The angular taper "A" of the mating surfaces may fall within a range of from about 20° which is shown in FIG. 2, to about 45° which is shown in FIG. 3, with respect to the axis of rotation "R". The preferred taper is about 30° with respect to the axis of rotation "R".

A further embodiment of the non-planar faces 46 and 60 may comprise not a truncated conical arrangement, but a truncated hemispherically shaped interface, the truncated portion comprising the central portion through which the shaft 32 extends. That is, the improved rotor 50 has a face 66 of arcuate configuration, as shown in FIG. 2A, the face 46 of the improved head assembly 42, having a face 68 defining a receiving surface of arcuate configuration. Each face 66 and 68 defines a truncated hemispherical surface, the openings of which permit the shaft 32 to be disposed therethrough.

The smooth mating surfaces of the improved head assembly 42 and the improved rotor 50 are preferably manufactured from any suitable material, but carbon is preferred. An "O"-ring 70 may be disposed in an annular groove 72 of the improved head assembly, to set it more tightly in the annular recess 40 in the housing 30.

Thus there has been shown and described a novel mechanical seal for pumps utilized in particulate laden environments, which seal is self-seating to compensate for eccentricities of components and mis-alignment or ellptical motion which may occur in a pump shaft, the seal being disposed in a recess of its attached housing to further minimize particulate buildup of its non-planar surface of contact, which thereby minimizes leakage and maximizes the lift cycle of the seal.

Though the invention has been described with a certain degree of specificity, it is intended that the appended claims be interpreted as exemplary only, and not in a limiting sense.

I claim:

1. A mechanical seal for disposition about a rotatable shaft in a first annular recess in a housing, said seal comprising:
   a head assembly disposed about said shaft and in the first annular recess in the housing, said head assembly having a second annular recess with a first tapered nonplanar surface in the shape of a truncated cone;
   a rotor disposed about said shaft, said rotor being biased towards said head assembly by a spring, said spring secured to said shaft by holding means; said rotor having a second tapered nonplanar surface in the shape of a truncated cone; the first and second surfaces being planar in the direction of the taper;
   the first nonplanar surface on said head assembly and the second nonplanar surface on said rotor, being in rotative contact with one another, to permit a self-seating between said non-planar surfaces of said head assembly and said rotor.

2. A mechanical seal as recited in claim 1, wherein the juncture between the faces of said head assembly and said rotor are disposable within the annular recess of the housing, to prevent particulate contamination therewithin.

3. A mechanical seal as recited in claim 1, wherein the angle of inclination of said truncated cone is between about 20° to about 45° with respect to the axis of rotation of said shaft.

4. A mechanical seal as recited in claim 3, wherein the angle of inclination of said truncated cone is about 30° with respect to the axis of rotation of said shaft.

5. A mechanical seal as recited in claim 1, wherein said non-planar faces are comprised of carbon.

* * * * *